A. F. STOCKLEY.
Scrubbing-Machine.
No. 199,875.   Patented Jan. 29. 1878.
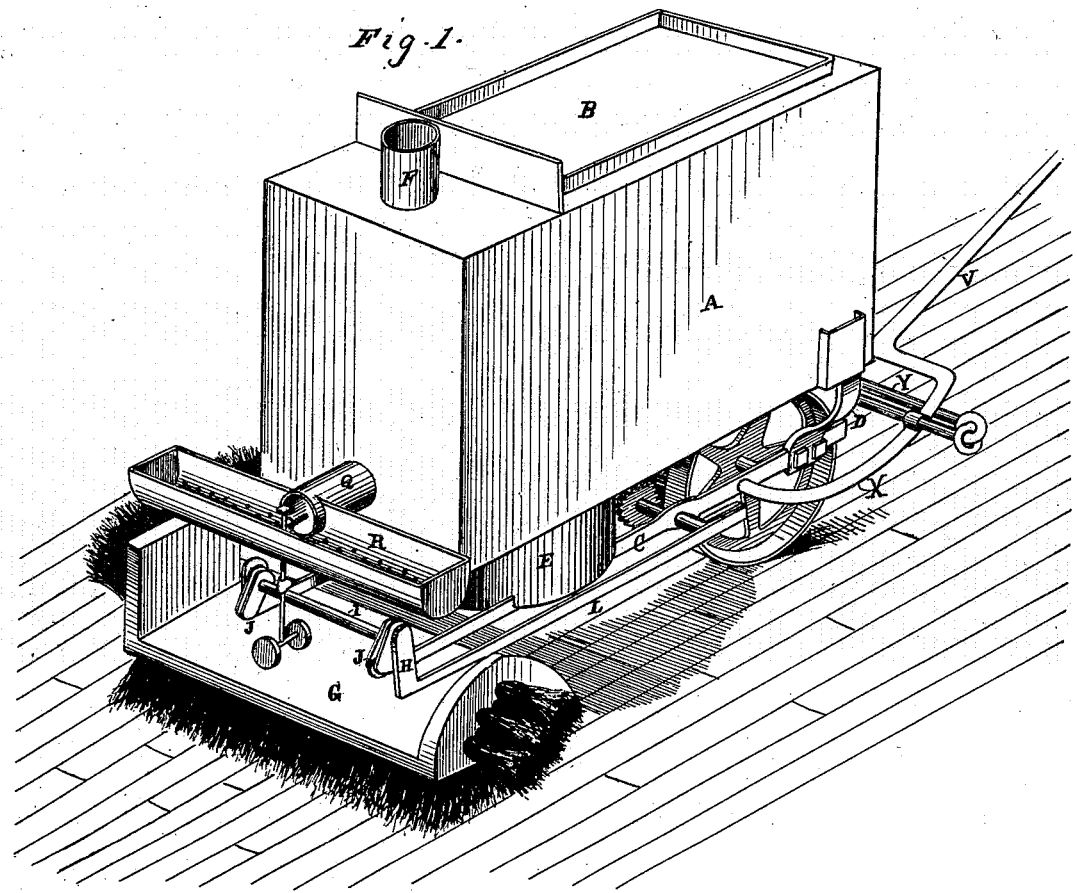
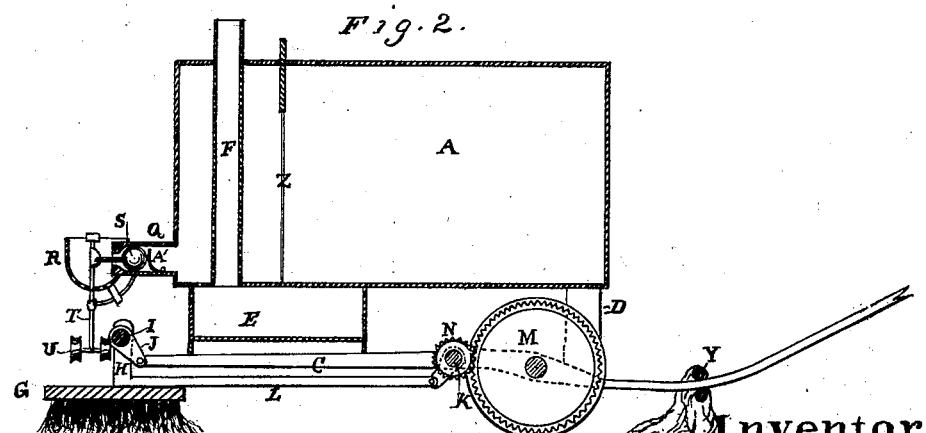

UNITED STATES PATENT OFFICE.

AUGUST F. STOCKLEY, OF BISHOP CREEK, CALIFORNIA.

IMPROVEMENT IN SCRUBBING-MACHINES.

Specification forming part of Letters Patent No. 199,875, dated January 29, 1878; application filed November 10, 1877.

*To all whom it may concern:*

Be it known that I, AUGUST F. STOCKLEY, of Bishop Creek, county of Inyo, and State of California, have invented a Combined Scrubbing and Mopping Machine; and I do hereby declare the following to be a full, clear, and exact description thereof, reference being had to the accompanying drawings.

My invention relates to a machine for scrubbing and mopping floors; and consists of a tank mounted upon a wheel at one end and a scrubbing-brush at the opposite end. This tank serves for containing and heating the water to be used in cleaning the floor.

I also provide a lamp-chamber below the tank, in which a lamp is carried for heating the water, a sprinkler for spraying the water upon the floor, and a brush and a mop for drying the floor after the brush has passed over it, the whole combined in one machine and operated automatically from the bearing-wheel, which, in part, supports the tank, as herein more fully described.

Referring to the accompanying drawings, Figure 1 is a perspective view; Fig. 2, a longitudinal section.

A represents a tank of any desired size and capacity. This tank has an open top, which can be tightly closed by a cover, B, and it is mounted upon a truck or frame, C, and supported above the frame by standards or uprights D at its rear end, and by a box, E, beneath the front of the tank. This box E also forms a chamber, in which I place a lamp or stove for heating the water in the tank and keeping it hot while the machine is in operation. A chimney, F, passes from the chamber E up through the tank, so as to create a draft for the lamp or stove in the box.

Beneath the front end of the frame C, I place a scrubbing-brush, G, and on the top of the brush, near each end, I secure two upright standards, H. A horizontal rock-shaft, I, is supported by the two standards H, and the front ends of the side bars of the frame C, I connect with this rock-shaft by short arms J.

The two upright standards H, I connect with the cranks of a crank-shaft, K, by long horizontal arms L. The motion that is imparted to the brush by this form of connection is a quick reciprocating scrubbing movement, and the brush is so placed under the frame that it receives the entire weight of the front part of the tank and machine, this weight materially assisting in the working of the brush.

The crank-shaft K is supported by the side bars of the frame C directly in front of the wheel M. This wheel M, I make with a sunken gear around the middle of its rim, and a pinion, N, on the shaft K connects with this gear, so that, as the machine is drawn about the floor, the motion of the wheel is communicated to the pinion, and is thus transmitted to the brush.

On the front side of the tank A, near its bottom, I secure a short outlet-pipe, Q, and on the end of this pipe a horizontal sprinkler, R, is attached, which hangs directly over and in line with the brush G.

In the outlet-pipe Q, I place a valve, S, and connect it, as shown in section, with a vertical rod, T, having a short arm on its lower end, and on this arm I place an adjustable nut, U, by which to regulate the opening and closing of the valve S.

I secure a handle, V, to the frame C by a socket and arms, X, as shown, and on these arms I attach a clamp or holder, Y, for securing and holding mop rags or cloths.

When the machine is placed upon the floor and put in motion, the valve S is opened by the nut U on the short arm of the vertical rod T striking against the shaft J as it reciprocates with the brush, and water from the tank is admitted to the sprinkler R, so as to be sprinkled upon the brush and floor in sufficient quantity.

A spring, A', in the pipe Q, closes the valve when the machine is not in motion, so that water is admitted into the sprinkler and onto the brush only when the brush is at work. The mop-cloths in the clamp Y follow in the path of the brush, and wipe the surface that has been scrubbed by the brush. This mop-clamp can be adjusted to either side of the handle-arms, so as to run close to the side of the floor or surface which is being cleaned.

The filter Z serves to filter the water as it passes into the supply-pipe, so that it will be clean and free from dirt as it falls from the sprinkler onto the brush.

The brush G may be of any size or shape, or made of any suitable material. In the present instance I have shown a brush with upright end pieces, so as to reach the sides and corners of any place that it may be desired to clean.

By this invention the labor and time usually required in cleaning and scrubbing floors are greatly diminished and the work is most thoroughly done.

Having thus described my invention, what I claim, and desire to secure by Letters Patent, is—

1. The herein-described arrangement of devices for giving a reciprocating movement to the brush, consisting of the wheel M, with a sunken gear in its outer periphery, pinion, cranks, and shaft K, horizontal arms L, and fixed upright standards H, substantially as specified.

2. The combination, with the tank A, of the sprinkler R, valve S, and its operating mechanism, consisting of the vertical rod T and arm and adjustable nuts U, substantially as herein shown and described.

In witness whereof I have hereunto set my hand and seal.

AUGUST FRIEDRICH STOCKLEY. [L. S.]

Witnesses:
D. CAMPBELL, Jr.,
M. A. CAMPBELL.